United States Patent
Masuda et al.

(10) Patent No.: US 7,852,600 B2
(45) Date of Patent: Dec. 14, 2010

(54) APPARATUS AND METHOD FOR READING OUT DATA RECORDED ON TAPE

(75) Inventors: Setsuko Masuda, Yamato (JP); Kenji Nakamura, Yamato (JP); Yutaka Oishi, Yamato (JP); Keisuke Tanaka, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 12/470,331

(22) Filed: May 21, 2009

(65) Prior Publication Data
US 2010/0014189 A1     Jan. 21, 2010

(30) Foreign Application Priority Data
Jul. 16, 2008     (JP) .............................. 2008-185083

(51) Int. Cl.
G11B 5/584     (2006.01)
(52) U.S. Cl. .................................................. 360/77.12
(58) Field of Classification Search ........................ None
See application file for complete search history.

(56) References Cited

U.S. PATENT DOCUMENTS
5,394,280 A * 2/1995 Chliwnyj et al. ......... 360/77.12

FOREIGN PATENT DOCUMENTS
WO     WO 03/083866 A1     10/2003

* cited by examiner

*Primary Examiner*—K. Wong
(74) *Attorney, Agent, or Firm*—Jeffrey P. Aiello

(57) ABSTRACT

An apparatus and method for reading out data recoded on a tape with a read head is provided. A command processing unit receives a request for reading out old data behind EOD of new data. A channel input/output unit receives, data read out with a read head and a buffer managing unit receives this data. A header information determining unit determines whether this data includes header information of the old data. If it is determined that this data includes the header information of the old data, a data set determining unit determines whether a data set is extractable from this data. If it is determined that data set is not extractable, a move signal output unit outputs a signal for moving the read head in a direction of the new data.

9 Claims, 10 Drawing Sheets

FIG. 3

| GENERATION | NUMBER OF WRAPS | TRACK WIDTH |
|---|---|---|
| FIRST GENERATION | 16 | 20.6 μm |
| SECOND GENERATION | 14 | 11.0 μm |
| THIRD GENERATION | 18 | 9.0 μm |

(a)

(b)

(c)

APPARATUS AND METHOD FOR READING OUT DATA RECORDED ON TAPE

BACKGROUND OF THE INVENTION

1. Field of the Invention

The present invention relates to an apparatus and method for reading out data recorded on a tape, and more particularly, to an apparatus and method for reading out data recoded on a tape with a read head.

2. Background Information

A plurality of kinds of data in different formats may coexist on a tape medium, such as a magnetic tape. For example, a case where old data recorded on a tape medium is overwritten with new data but the old data still remains behind the new data corresponds to such a case. In such a case, when a request for reading out a specific kind of data from the plurality of kinds of data is made, the plurality of kinds of data has to be discriminated one another and only the specific kind of data has to be extracted.

A method for discriminating old data previously recorded on a tape medium and new data newly recorded on the tape medium from one another has already been proposed in the art. Therein, new data is recorded on a tape medium in association with a data freshness degree, which is information indicating freshness of the new data relative to the previously recorded old data.

However, a problem occurs if a position of a read head overlaps a position where a plurality of kinds of data are recorded at the time of reading out of a specific kind of data from a plurality of kinds of data of different formats with the read head. More specifically, a read error occurs frequently and back-hitching occurs, due to which it undesirably takes some time to read out the data.

SUMMARY OF THE INVENTION

In one embodiment, an apparatus for reading out data recorded on a tape medium with a read head. The apparatus includes a receiving unit for receiving a request for reading out first data from the tape medium on which the first data and second data are recorded in different formats, a detecting unit for detecting, in response to the receiving unit's reception of the request, whether the read head and the first and second data recorded on the tape medium are in a specific positional relationship in which existence of the first data is recognizable but the first data is not readable, and a moving unit for moving, if the detecting unit detects that the read head and the first and second data are in the specific positional relationship, the read head toward a position where the second data is recorded so that reading of the second data is skipped while existence of the second data is recognizable and the first data is read out after the existence of the first data becomes recognizable.

In another embodiment, an apparatus for reading out data recorded on a tape medium. The apparatus includes a read head for reading out data recorded on the tape medium, a controller for controlling, if it is detected, in response to a request for reading out first data from the tape medium on which the first data and second data are recorded in different formats, that the read head and the first and second data recorded on the tape medium are in a positional relationship in which existence of the first data is recognizable but the first data is not readable, movement of the read head to a position where the second data is recorded, and a moving mechanism for moving the read head in accordance with the control of the controller.

In an alternative embodiment, a method for reading out data recorded on a tape medium with a read head. The method includes the steps of receiving a request for reading out first data from the tape medium on which the first data and second data are recorded in different formats, detecting, in response to the reception of the request, whether the read head and the first and second data recorded on the tape medium are in a specific positional relationship in which existence of the first data is recognizable but the first data is not readable, moving, if it is detected that the read head and the first and second data are in the specific positional relationship, the read head toward a position where the second data is recorded, and skipping reading of the second data while existence of the second data is recognizable and reading out the first data after existence of the first data becomes recognizable.

Other, advantages and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which:

FIG. 3 is a diagram showing a correspondence of a generation of a tape, the number of wraps, and a track width;

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a", "an", and "the" include plural referents unless otherwise specified.

Figure 1:
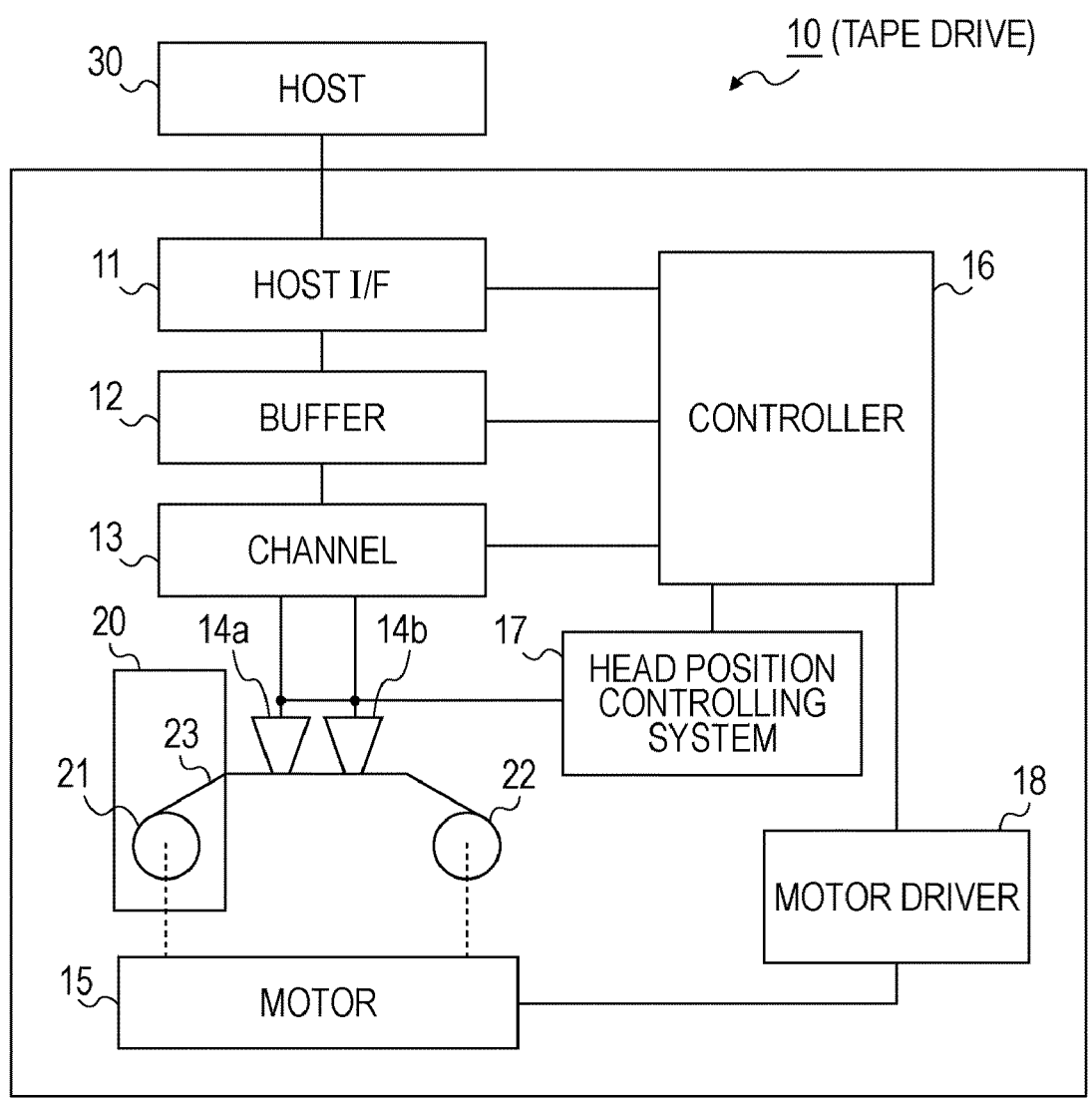
FIG. 1 is a block diagram showing a configuration of a tape drive.

FIG. 1 is a diagram showing an example of a configuration of a tape drive 10 to which an embodiment is applied. This tape drive 10 includes a host interface (hereinafter, referred to as a "host I/F") 11, a buffer 12, a channel 13, a write head 14a, a read head 14b, and a motor 15. The tape drive 10 also includes a controller 16, a head position controlling system 17, and a motor driver 18. Furthermore, since a tape cartridge 20 can be inserted into the tape drive 10, the tape cartridge 20 is also illustrated herein. This tape cartridge 20 includes a tape 23 wound around reels 21 and 22. In response to rotation of the reels 21 and 22, the tape 23 moves in a longitudinal direction, i.e., from the reel 21 to the reel 22 or from the reel 22 to the reel 21. Although a magnetic tape is employed as an example of the tape 23, tape media other than the magnetic tape may be employed.

The host I/F 11 communicates with a host 30, which is an example of an upper-layer apparatus. For example, the host I/F 11 receives, from the host 30, a command for instructing writing of data on the tape 23, a command for moving the tape 23 to a target position, and a command for instructing readout of data from the tape 23. As a communication standard used by this host I/F 11, a small computer system interface (SCSI) is employed, for example. In the case of the SCSI, the above-described first, second, and third commands correspond to a "write" command, a "locate" or "space" command, and a "read" command, respectively. The host I/F 11 also returns, to the host 30, a response indicating whether processing corresponding these commands has succeeded or failed.

The buffer 12 is a memory for storing data to be written on the tape 23 and data read out from the tape 23. For example, the buffer 12 is constituted by a dynamic random access memory (DRAM). In addition, the buffer 12 is constituted by a plurality of buffer segments. Each buffer segment stores data sets, each of which is a unit of readout and writing of data from and on the tape 23, respectively.

The channel 13 is a communication path used for transferring, to the write head 14a, data to be written on the tape 23 or receiving, from the read head 14b, data read out from the tape 23.

The write head 14a writes information on the tape 23 when the tape 23 moves in the longitudinal direction. The read head 14b reads out information from the tape 23 when the tape 23 moves in the longitudinal direction. The motor 15 rotates the reels 21 and 22. Although the motor 15 is represented by one rectangle in the drawing, two motors each for the respective reels 21 and 22 are preferably provided as the motor 15.

On the other hand, the controller 16 controls the entire system of the tape drive 10. For example, in accordance with a command received by the host I/F 11, the controller 16 controls writing of data on the tape 23 or readout of data from the tape 23. In addition, the controller 16 controls the head position controlling system 17 and the motor driver 18.

The head position controlling system 17 is a system for tracking one or more desired wraps. Here, a wrap equates to a group of a plurality of tracks on the tape 23. Since the write head 14a and the read head 14b have to be electrically switched in response to necessity of switching the wrap, the head position controlling system 17 controls such a switching operation. In this embodiment, the head position controlling system 17 is provided as an example of a moving mechanism for moving a read head. The motor driver 18 drives the motor 15. As described above, when two motors 15 are employed, two motor drivers 18 are provided.

An embodiment will be described in detail below using an IBM enterprise tape drive TS1120 as an example of the tape drive 10. First, a format on the tape 23 will be described as an assumption of this embodiment.

Figure 2:
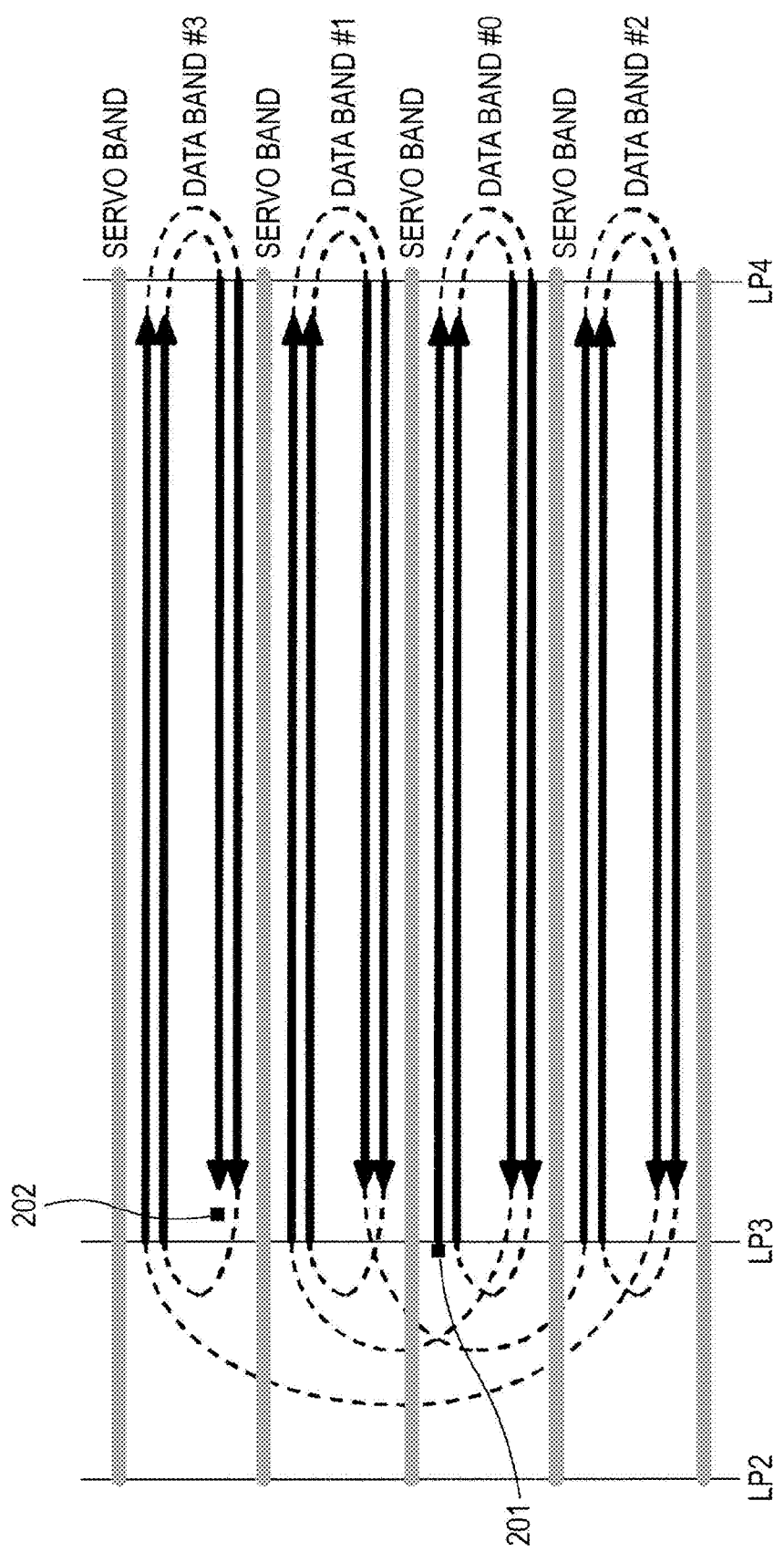
FIG. 2 is a diagram showing a format of a tape employed in an embodiment of the invention.

FIG. 2 is a diagram showing an overview of a format on the tape 23. In the drawing, an area between LP2 and LP3 corresponds to a calibration area, whereas an area between LP3 and LP4 corresponds to a user data area.

As illustrated in the drawing, five servo bands are provided on the tape 23. The servo band is an area where a servo pattern indicating a physical position on the tape 23 is written at the time of manufacture of the tape 23.

In addition, the tape 23 is divided into four data bands by these five servo bands. The data band is an area where user data is written. Each data band includes a dozen or so long and narrow data areas called wraps. In the drawing, one solid arrow represents one wrap. Data is written in or read out from a wrap in a forward direction as shown by a right arrow. Thereafter, the data is written in or read out from a wrap in a reverse direction as shown by a left arrow connected to the right arrow through a broken line. In the drawing, two wraps, namely, a wrap in which data is written and read out in the forward direction and a wrap in which data is written and read out in the reverse direction, are illustrated in one data band for the purpose of simplification. However, in practice, one data band includes 7-9 forward-direction wraps and 7-9 reverse-direction wraps and the wraps are arranged in one data band like a coil. More specifically, by repeating writing and reading of data in the forward direction and in the reverse direction, the data is written on and read out from the tape 23 while the tape 23 travels back and forth many times.

Furthermore, data is written on and read out from the tape 23 having such a format along wraps arranged like a coil in a data band #0 using a start position 201 as the origin. Thereafter, the tape 23 is moved to sequentially reach data bands #1, #2, and #3. The data is written or read out along wraps arranged like a coil in the respective data bands to reach an end position 202. More specifically, since the movement to the following data band takes approximately five seconds, the data band is switched to the following one after one data band is used up.

Meanwhile, FIG. 2 is only a conceptual diagram in which a relation between the format and the write and read heads 14a and 14b is not considered. The tape drive 10 generally includes a plurality of write heads 14a and a plurality of read heads 14b. For example, when a solid arrow shown in FIG. 2 is considered as a data-writing or data-reading track of one write head 14a or one read head 14b, this solid arrow corresponds to a track. When it is assumed that a right arrow indicates a forward-direction track for a first write head 14a or a first read head 14b, forward-direction tracks for the second, third, and following write heads 14a or the second, third, and following read heads 14b are sequentially provided behind this track. In addition, when it is assumed that a left arrow indicates a reverse-direction track for the first write head 14a or the first read head 14b, reverse-direction tracks for the second, third, and following write heads 14a or the second, third, and following read heads 14b are sequentially provided behind this track.

The number of wraps per data band and the width of each track (track width) are defined by a standard of each generation. To achieve a large storage capacity, the track width tends to get narrow as the generation increases.

FIG. 3 is a diagram showing the number of wraps and the track width for each generation. As shown in the drawing, each data band includes 16 wraps in the first generation. More specifically, this state corresponds to a state where there are eight right arrows and eight left arrows in FIG. 2. The track width of the first generation is set equal to 20.6 µm.

In addition, each data band includes 14 wraps in the second generation. More specifically, this state corresponds to a state where there are seven right arrows and seven left arrows in FIG. 2. The track width of the second generation is set equal to 11.0 µm.

Furthermore, each data band includes 18 wraps in the third generation. More specifically, this state corresponds to a state where there are nine right arrows and nine left arrows in FIG. 2. The track width of the third generation is set equal to 9.0 µm.

The tape drive 10 writes data on the tape 23 having such a format in a unit called data set. After finishing writing user data, the tape drive 10 writes a special data set indicating an end of effective data there behind. This special data set is called EOD (end of data).

Generally, upon finding the EOD during a read operation of the data, the tape drive 10 terminates the read operation since the effective data does not exist behind the EOD.

However, reading of old data remaining behind the EOD from the tape 23 on which a user has mistakenly overwritten the data may be requested. Some tape drives 10 may have a "read-after-EOD" function for reading out data sets recorded behind the EOD to realize such a request.

In a "read-after-EOD" operation, the tape drive 10 skims through header information of a data set at an area located behind the EOD. This action is called skimming. On the basis of the header information resulting from the skimming, the tape drive 10 performs a read operation at an area that may include data sets.

The header information can be acquired from a fragment of a data set, writing of which has failed due to a write error. Accordingly, the information collected in the skimming includes header information of incomplete data sets, namely, unreadable data sets. Since a read operation performed on such a fragment of the data set results in an error, the information resulting in an error is discarded and a data set having the following header information is then read out. Meanwhile, the standard of the tape drive 10 guarantees that at least one readable data set exists within four meters. Accordingly, the read operation is generally terminated after reading four meters of the tape at longest. On the other hand, upon fining a readable data set, the tape drive 10 starts the read operation from this data set.

The tape drive 10 can also overwrite data written on the tape 23 in a format of a given generation with data in a format according to another generation from a top of the tape 23. This operation is called reformat.

Figure 4:
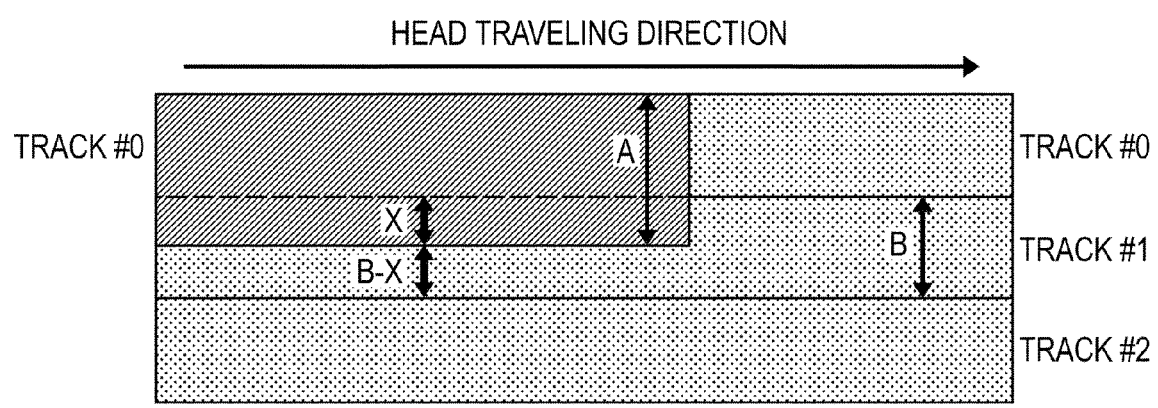
FIG. 4 is a diagram for illustrating reformatting in which old data is overwritten with new data.

FIG. 4 is a diagram showing a state of this reformat. As shown in the drawing, old data shown by halftone dot meshing is overwritten with new data shown by oblique lines. Numerals, such as tracks #0, #1, #2, . . . , are sequentially assigned to tracks on the tape 23 from, for example, an upper end of FIG. 2. Although a topmost track in FIG. 4 is illustrated as the track #0, the track #0 does not necessarily indicate a track at the end of the tape 23. Numerals, such as tracks #0, #1, and #2, are attached only for convenience of the explanation, it may be considered that a middle potion of the tape 23 is extracted. Since it is assumed that tracks #0, #1, and #2 are tracks from which the identical read head 14b reads out the data, the wrap numbers shown in FIG. 2 are not necessarily serial numbers and may be alternate numbers, such as wraps #0, #2, and #4.

As shown in the drawing, a track width A of data existing after the reformat differs from a track width B of data existing before the reformat. For example, when reformat is performed by writing data of the second generation format on the tape 23, on which data of the third generation format has been written, the track width is changed from 9 µm to 11 µm. In such a case, part of the old data written in a track, among tracks containing the old data, neighboring a new-data-containing track is deleted by the new data. This is called "shingling" and an area where part of data is overwritten by the shingling is called a "shingling area". Meanwhile, in this embodiment, the old data and the new data are employed as examples of first data and second data, respectively.

A width of a neighboring track overwritten by the shingling (shingling width) depends on the track width of the respective formats before and after the overwriting and the number of tracks where the new data is written, and may be various values. For example, the tape is reformatted from the third generation to the second generation, the shingling width X (µm) at an m-th track of the third generation when n second generation tracks are overwritten in an identical data band can be determined with Equation given below.

In Equation given below, "9M−11N≦0" indicates a case where the shingling is caused and the track is completely overwritten. "0<9M−11N<9" indicates a case where the shingling is caused and part of the track is overwritten. Additionally, "9M−11N≧9" indicates a case where the shingling is not caused.

$$X = \begin{cases} 9 & (9M - 11N \leq 0) \\ 9 - (9M - 11N) & (0 < 9M - 11N < 9) \\ 0 & (9M - 11N \geq 9) \end{cases}$$ [Equation 1]

Generally, since only the old data is written in a track neighboring the new-data-containing track and the old data is not read out, an inconvenience is not caused.

However, when the old data is read out in a read-after-EOD operation, the read operation is performed regarding a track including data, part of which is deleted by the shingling. The shingling width depends on the track widths of the respective formats before and after the overwriting. Depending on this width, a position of the read head 14b may overlap a position of the new data. Depending on this overlap, behavior of the tape drive 10 in the read-after-EOD operation is classified into three types.

Figure 5:
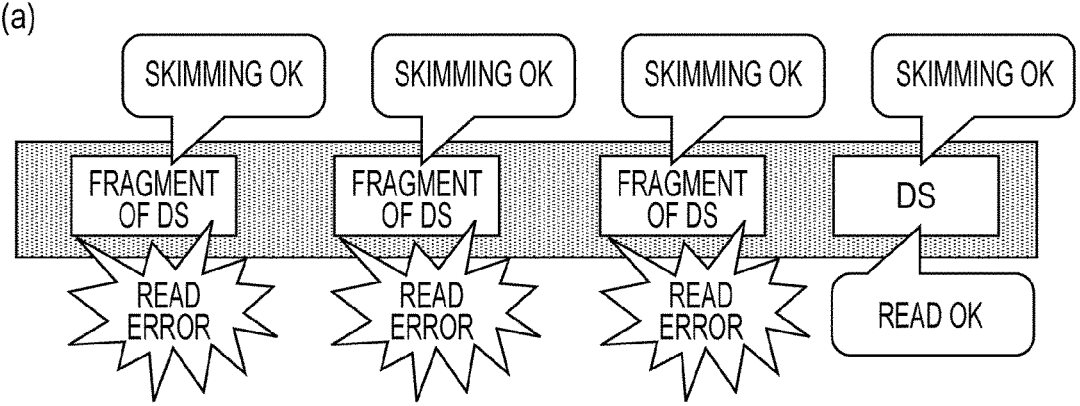
FIG. 5 is a diagram for illustrating behavior of a tape drive depending on an overlapping state of a read head and new data.
Figure 5:
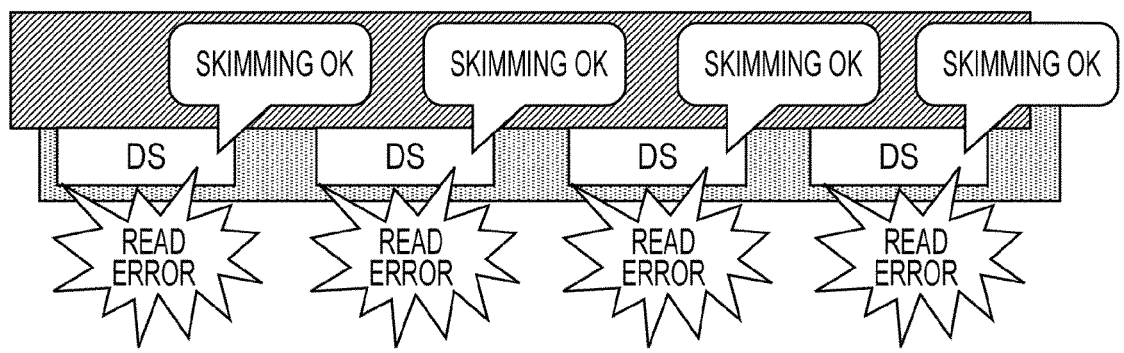
Figure 5:
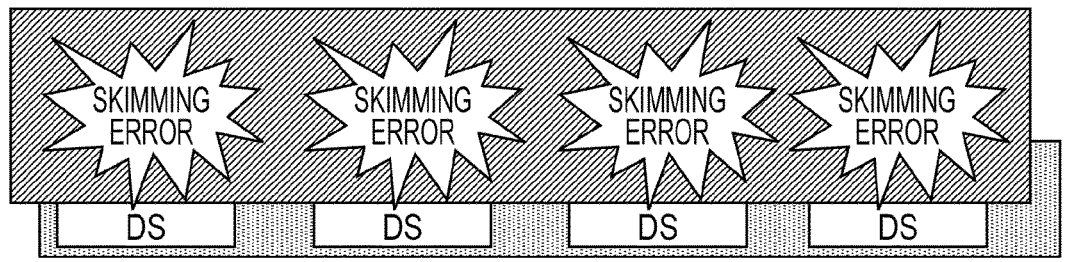

Accordingly, these three types of behavior of the tape drive 10 will be described. FIG. 5 is a diagram showing these three types of behavior. In the drawing, an area with halftone dot meshing represents the old data, whereas an area with oblique lines represents the new data. In addition, a data set is abbreviated as "DS".

FIG. 5(a) shows behavior performed when the read head 14b does not overlap the new data. In this case, the tape drive 10 can acquire the header information by the skimming from an old-data-containing area and read out data sets on the basis of this header information. As shown in the drawing, there is a case where the skimming succeeds but reading of the data set fails. In such a case, by repeating the skimming and the readout of the data set several times, the tape drive 10 can read out the data set.

In addition, FIG. 5(b) shows behavior performed when part of the read head 14b overlaps the new data. In this case, the tape drive 10 reads out information from a new-data-containing area in addition to information from an old-data-containing area. Since the header information is written redundantly compared with the user data and can be read out readily, the skimming succeeds under such a circumstance. However, even if a data set is expected to be write-error free, namely, even if the data set is expected to be readable, the tape drive 10 cannot read out the whole data set.

Furthermore, FIG. 5(c) shows behavior performed where most part of the read head 14b overlaps the new data.

In this case, the tape drive 10 cannot obtain the header information by the skimming. Accordingly, the tape drive 10 determines that a readable data set does not exist in that area. The tape drive 10 moves the tape while performing the skimming until the header information is obtained. After passing through the shingling area, the tape drive 10 starts reading out the data sets on the basis of information resulting from the skimming as in the case where the shingling is not caused.

In the cases shown in FIGS. 5(*a*) and 5(*c*), the tape drive 10 moves the tape 23 at a skimming speed until the tape drive 10 encounters a readable data set and then starts the read operation. Accordingly, a problem is not caused.

However, in the case shown in FIG. 5(*b*), since the tape drive 10 attempts to read out the data sets on the basis of all pieces of the header information resulting from the skimming, a success of the skimming and a failure in readout of the data set are alternately repeated as longs as the shingling area continues. More specifically, the skimming and the readout of the data set are repeated as in the case of FIG. 5(*a*) but a failure in readout of the data set is repeated over a long distance. If the readout results in an error, processing for rewinding the tape (back-hitching) is performed every time the error occurs. Since one back-hitching operation takes approximately five seconds, a vast amount of time is needed to find a readable data set.

This will be described using specific values. The shingling is caused for a length of two tracks, namely, 1400 meters, at longest. A length of one data set is approximately equal to 7 centimeters. Accordingly, up to approximately 20000 data sets exit in the shingling area. If the back-hitching is performed for all of the data sets, it takes approximately 28 hours (=20000×5 seconds) to pass through the shingling area.

Figure 6:
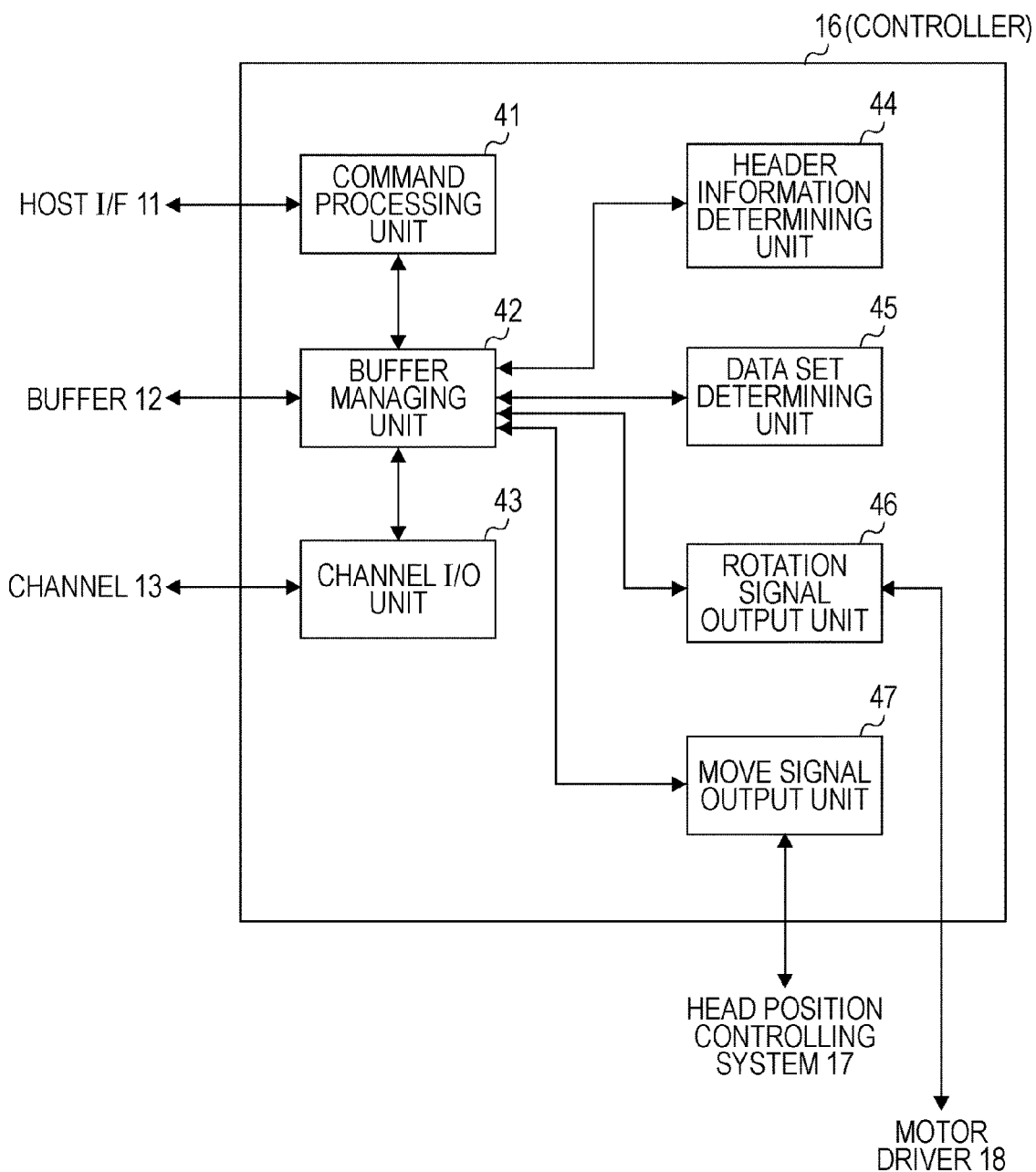
FIG. 6 is a block diagram showing an example of a functional configuration of a controller.

Accordingly, a method for avoiding this problem in the tape drive 10 is proposed in this embodiment. First, a functional configuration of the controller 16 will be described. FIG. 6 is a block diagram showing an example of a functional configuration of the controller 16.

As shown in the drawing, the controller 16 includes a command processing unit 41, a buffer managing unit 42, a channel input/output (I/O) unit 43, a header information determining unit 44, a data set determining unit 45, a rotation signal output unit 46, and a move signal output unit 47.

The command processing unit 41 receives commands from the host I/F 11. Kinds of the commands include a write command for instructing storage of data in the buffer 12, a synchronize command for instructing writing of the data stored in the buffer 12 on the tape 23, and a read command for instructing reading out of the data from the tape 23. In this embodiment, the command processing unit 41 is provided as an example a receiving unit for receiving a request for reading out first data from a tape medium on which the first data and second data are recorded.

The buffer managing unit 42 prepares data in the buffer 12 when the command processing unit 41 receives the write command. In addition, when the command processing unit 41 receives the synchronize command, the buffer managing unit 42 reads out the data from the buffer 12 and outputs the data to the channel I/O unit 43. Furthermore, when the command processing unit 41 receives the read command, the buffer managing unit 42 instructs the channel I/O unit 43 to read out target data if the target data is not stored in the buffer 12 or returns the target data to the host 30 through the command processing unit 41 if the target data is stored in the buffer 12.

The channel I/O unit 43 outputs data read out from the buffer 12 by the buffer managing unit 42 to the channel 13 and outputs data received from the channel 13 to the buffer managing unit 42.

The header information determining unit 44 determines whether header information obtained through the channel I/O unit 43 and the buffer managing unit 42 is regarding a target format, thereby determining whether the read head 14*b* is currently located at a skimming succeeding position on the tape 23. In this embodiment, the header information determining unit 44 is provided as examples of a detecting unit for detecting whether a read head and first and second data are in a positional relationship in which existence of the first data is recognizable, a first determining unit for determining whether the read head is located at a position where one of the first data and the second data is recorded, and a skipping unit for skipping reading of the second data.

The data set determining unit 45 determines whether a data set obtained through the channel I/O unit 43 and the buffer managing unit 42 is decodable, thereby determining whether the read head 14*b* is currently located at a data-set-readout succeeding position on the tape 23. In this embodiment, the data set determining unit 45 is provided as examples of a detecting unit for detecting whether a read head and first and second data are in a positional relationship in which the first data is not readable, a second determining unit for determining whether the read head is located at a position where the first data is readable, and a reading unit for reading out the first data.

The rotation signal output unit 46 outputs, to the motor driver 18, a signal for moving the tape 23 and a signal for the back hitching of the tape 23.

The move signal output unit 47 outputs, to the head position controlling system 17, a signal for offsetting a position of the read head 14*a* relative to the tape 23 in a breadthwise direction of the tape 23. In this embodiment, the move signal output unit 47 is provided as an example of a moving unit for moving a read head toward a position where second data is recorded.

For example, the following method (hereinafter, referred to as a "first method") is available as a method for avoiding the problem shown in FIG. 5(*b*).

Figure 7:
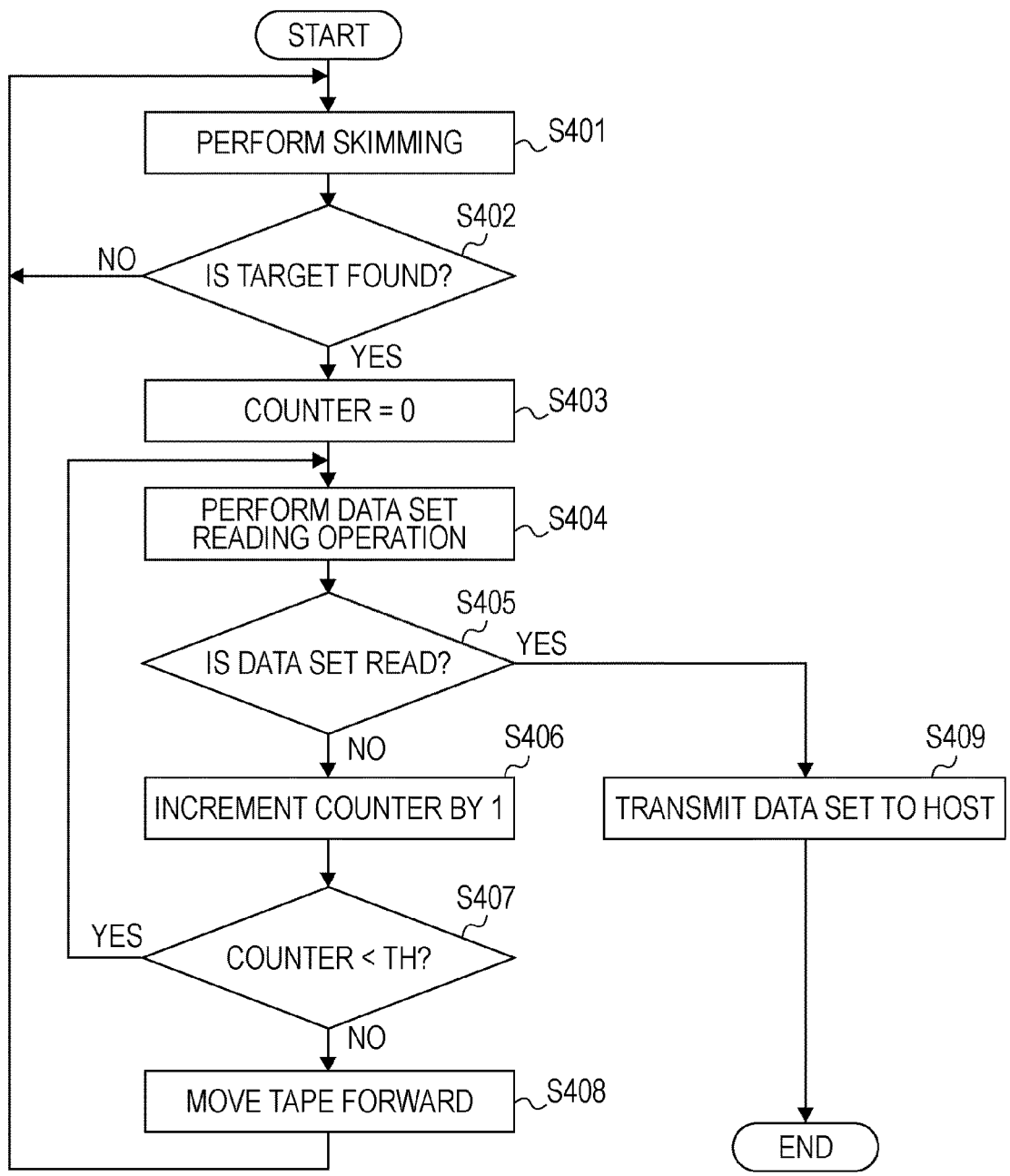
FIG. 7 is a flowchart showing a procedure of a first problem-solving method.

FIG. 7 is a flowchart showing a procedure of this first method.

In the controller 16, the command processing unit 41 first receives a read-after-EOD request. For example, the command processing unit 41 may recognize the read-after-EOD request by receiving the read command twice after a read position on the tape 23 reaches the EOD. The command processing unit 41 informs the buffer management unit 42 of the reception of the read-after-EOD request. This flowchart shows an operation performed thereafter by the controller 16 to read out one data set of the old data using the read head 14*b*.

The buffer managing unit 42 controls each mechanism to perform a skimming operation on the tape 23 (STEP S401). More specifically, the buffer managing unit 42 instructs the rotation signal output unit 46 to output, to the motor driver 18, a signal for moving the tape 23 at a normal reading speed. The rotation signal output unit 46 then outputs such a signal to the motor driver 18, whereby the motor driver 18 causes the tape 23 to run at the normal reading speed. In addition, the buffer managing unit 42 receives data read out by the read head 14*b* from the channel I/O unit 43 and transfers the data to the header information determining unit 44.

The header information determining unit 44 then extracts header information from the data and determines whether this header information is regarding the target old data, namely, whether the target is found (STEP S402). Here, the header information may be bit information indicating whether the data is recorded in an even-number track or an odd-number track. In this case, since the bit information of the old data differs form the bit information of the new data, which continues from the neighboring track, the header information determining unit 44 can determine whether the old data or the new data is found. Alternatively, write pass (WP) information may be used as the header information. The WP information is a number incremented every time data is written. The old data has a smaller WP value, whereas the new data has a larger WP value. Accordingly, whether the old data or the new data is found can be determined. If the target is not found, the process returns to STEP S401 and the skimming is repeated. On the other hand, if the target is found, a read operation is attempted using the header information.

More specifically, after the buffer managing unit 42 transfers the data received from the channel I/O unit 43 to the data set determining unit 45, the data set determining unit 45 sets a counter for counting the number of times the read operation is attempted to "0" (STEP S403). The read operation is then performed (STEP S404). Subsequently, whether a data set is read out is determined (STEP S405).

As a result, if it is determined that the data set is not read out, the data set determining unit 45 increments the counter by "1" (STEP S406). Whether the counted value is smaller than a threshold Th is then determined (STEP S407). If the counted value is smaller than the threshold Th, the back hitching is performed, the processing returns to STEP S404, and the read operation is repeated. In addition, if the counted value is not smaller than the threshold Th, it is determined that a problem is caused due to an influence of the shingling and the tape 23 is moved in a traveling direction by a predetermined distance L (STEP S408). More specifically, the buffer managing unit 42 instructs the rotation signal output unit 46 to output, to the motor driver 18, a signal for moving the tape 23 by the predetermined distance L at a maximum speed. The rotation signal output unit 46 outputs such a signal to the motor driver 18, whereby the motor driver 18 causes the tape 23 to travel the predetermined distance L at the maximum speed. The process then returns to STEP S401 and the operation is started over from the skimming.

On the other hand, if the data set is read out at STEP 405 while the counted value is smaller than the threshold Th, the data set determining unit 45 transfers the data set to the buffer managing unit 42. The buffer managing unit 42 transmits the data set to the host 30 through the command processing unit 41 (STEP S409).

Meanwhile, the threshold Th for the number of times reading of the data set is attempted and the travel distance L of the tape 23 may be set equal to, for example, 20 times and 50 meters, respectively. These values are empirically set to pass through the shingling area within an appropriate processing time.

However, in this first method, if a shingling-influence-free data set exists between an end of the shingling area and a data set that is read out first, such a data set is missed. In addition, when the shingling area continues long, processing of STEPs 401 to 408 is repeated many times. Accordingly, this is not efficient and the processing takes long time.

Accordingly, in an embodiment, a method for moving the read head 14b, at the time of the skimming, along one end of a track where the new data is written if the tape drive 10 detects a state where a reading-start data set cannot be found due to the influence of the shingling in a read-after-EOD operation (hereinafter, referred to as a second method) is proposed.

According to this second method, since data is not obtained in the skimming, an unnecessary read operation is not requested and the read head can pass through the shingling area at a skimming speed without performing the back hitching.

Figure 8:
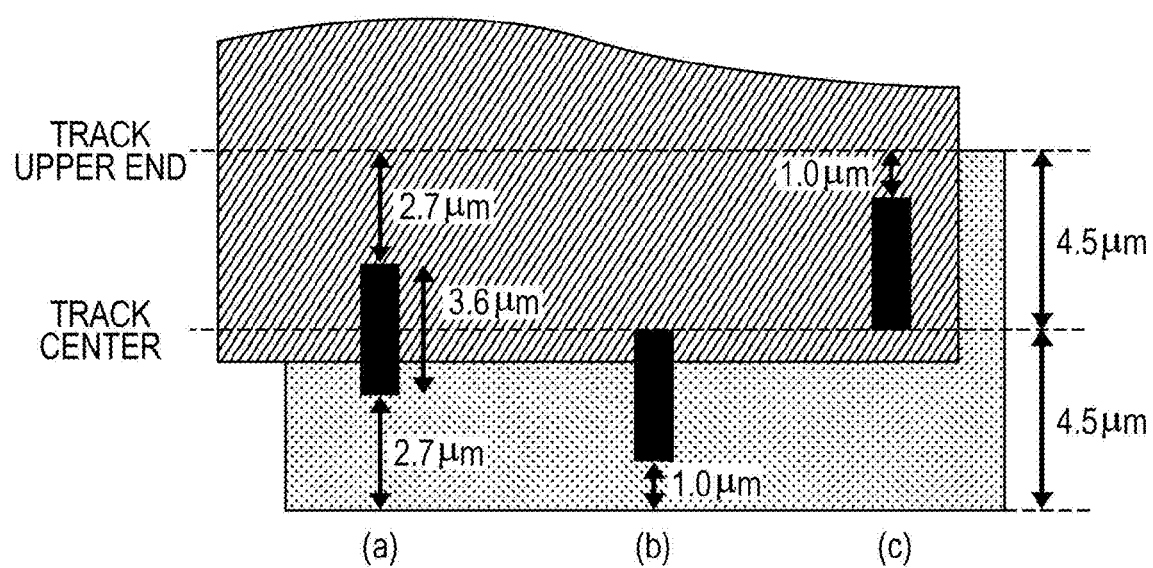
FIG. 8 is a diagram for illustrating an overview of a second problem-solving method.

FIG. 8 is a diagram showing an overview of an operation of the second method. Meanwhile, in the drawing, an area with halftone dot meshing represents the old data, whereas an area with oblique lines represents the new data. In addition, in the drawing, an upper end portion and a lower end portion of a track are referred to as an upper end and a lower end, respectively. It is assumed that a shingling area exists on the upper end side of the track.

In a normal read operation, the tape drive 10 first locates the read head 14b at a position where the center of the read head 14b matches the center of a track as shown in (a).

In addition, during a read-after-EOD operation, the tape drive 10 offsets the position of the read head 14b to a lower side of the track in consideration of the influence of the shingling as shown in (b). The offset value is set to have a margin so that an influence of a neighboring track is avoided.

However, when the influence of the shingling still exists under this circumstance, the shingling width is equal to or greater than 4 μm, which is wider than the width of the read head 14b. In such a case, the read head 14b is offset to the upper side of the track. With this action, the read head 14b is contained in the shingling area and cannot obtain header information of old data even if the skimming is performed. Accordingly, repetition of an attempt to read out each data set in the shingling area and a failure of the attempt is avoided and the read head 14b can pass through the shingling area without performing the back hitching.

Whether a current position is within the shingling area may be determined in a manner similar to that of the first method. More specifically, when a success in the skimming and a failure in readout of the data set are repeated a predetermined times (e.g., 20 times), it may be determined that the current position is within the shingling area.

After an end of the shingling area, the header information of proper data sets on a track can be read out in the skimming even if the read head 14b is offset. Accordingly, a reading operation can be started from a data set located immediately after the end of the shingling area.

Figure 9:
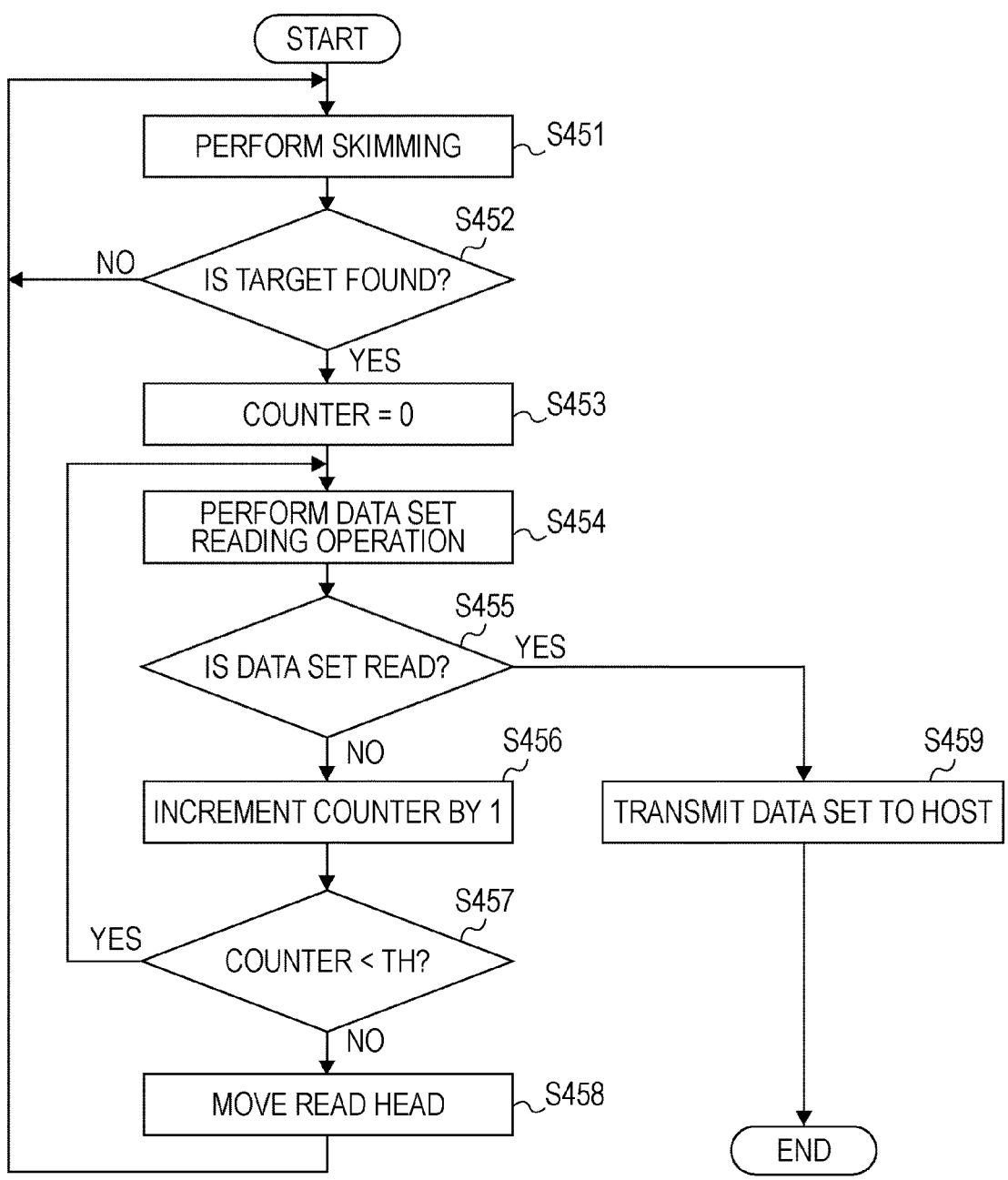
FIG. 9 is a flowchart showing a procedure of a second problem-solving method.

FIG. 9 is a flowchart showing a procedure of this second method.

In the controller 16, the command processing unit 41 first receives a read-after-EOD request. For example, the command processing unit 41 may recognize the read-after-EOD request by receiving the read command twice after a read position on the tape 23 reaches the EOD. The command processing unit 41 informs the buffer management unit 42 of reception of the read-after-EOD request. This flowchart shows an operation performed thereafter by the controller 16 to read out one data set of the old data using the read head 14b.

First, the buffer managing unit 42 controls each mechanism to perform a skimming operation on the tape 23 (STEP S451). More specifically, the buffer managing unit 42 instructs the rotation signal output unit 46 to output, to the motor driver 18, a signal for moving the tape 23 at a normal reading speed. The rotation signal output unit 46 outputs such a signal to the motor driver 18, whereby the motor driver 18 causes the tape 23 to travel at the normal reading speed. In addition, the buffer managing unit 42 receives data read out by the read head 14b from the channel I/O unit 43 and transfers the data to the header information determining unit 44.

The header information determining unit 44 then extracts header information from the data and determines whether this header information is regarding target old data, namely, whether the target is found (STEP S452). Here, the header information may be bit information indicating whether the data is recorded in an even-number track or an odd-number track. In this case, since the bit information of the old data differs form the bit information of the new data, which continues from the neighboring track, whether the old data or the new data is found can be determined. Alternatively, write pass (WP) information may be used as the header information. The WP information is a number incremented every time data is written. The old data has a smaller WP value, whereas the new data has a larger WP value. Accordingly, whether the old data or the new data is found can be determined. If the target is not found, the process returns to STEP S451 and the skimming operation is repeated. On the other hand, if the target is found, a read operation is attempted using the header information.

More specifically, after the buffer managing unit 42 transfers the data received from the channel I/O unit 43 to the data set determining unit 45, the data set determining unit 45 sets a counter for counting the number of times the read operation is attempted to "0" (STEP S453). The read operation is then performed (STEP S454). Subsequently, whether a data set is read out is determined (STEP S455).

As a result, if it is determined that the data set is not read out, the data set determining unit 45 increments the counter by "1" (STEP S456) and determines whether the counted value is smaller than a threshold Th (STEP S457). If the counted value is smaller than the threshold Th, the back hitching is performed, the processing returns STEP S454, and the read operation is repeated. In addition, if the counted value is not smaller than the threshold Th, it is determined that a problem is caused due to an influence of the shingling and the read head 14b is moved in a direction of the new data (STEP S458). More specifically, the buffer managing unit 42 instructs the move signal output unit 47 to output, to the head position controlling system 17, a signal for moving the read head 14b in the direction of the new data. The move signal output unit 47 outputs such a signal to the head position controlling system 17, whereby the head position controlling system 17 moves the read head 14b in the direction of the new data. The process then returns to STEP S451 and the operation is started over from the skimming.

On the other hand, if the data set is read out at STEP S455 while the counted value is smaller than the threshold Th, the data set determining unit 45 transfers the data set to the buffer managing unit 42. The buffer managing unit 42 transmits the data set to the host 30 through the command processing unit 41 (STEP S459).

In addition, the following operation is performed after moving the read head 14b in an area of the new data at STEP S458.

Since it is determined that the header information extracted from the read out data is not the header information of the old data, i.e., the target is not found, at STEP S452, STEP S451 is repeated first.

After the read head 14b passes through the shingling area, it is determined that the header information extracted from the read out data is the header information of the old data, i.e., the target is found, at STEP S452. Accordingly, a data set read operation of STEPs S453 to S457 is executed. The data set can be read out at STEP S455 while the counted value is smaller than the threshold Th.

Figure 10:
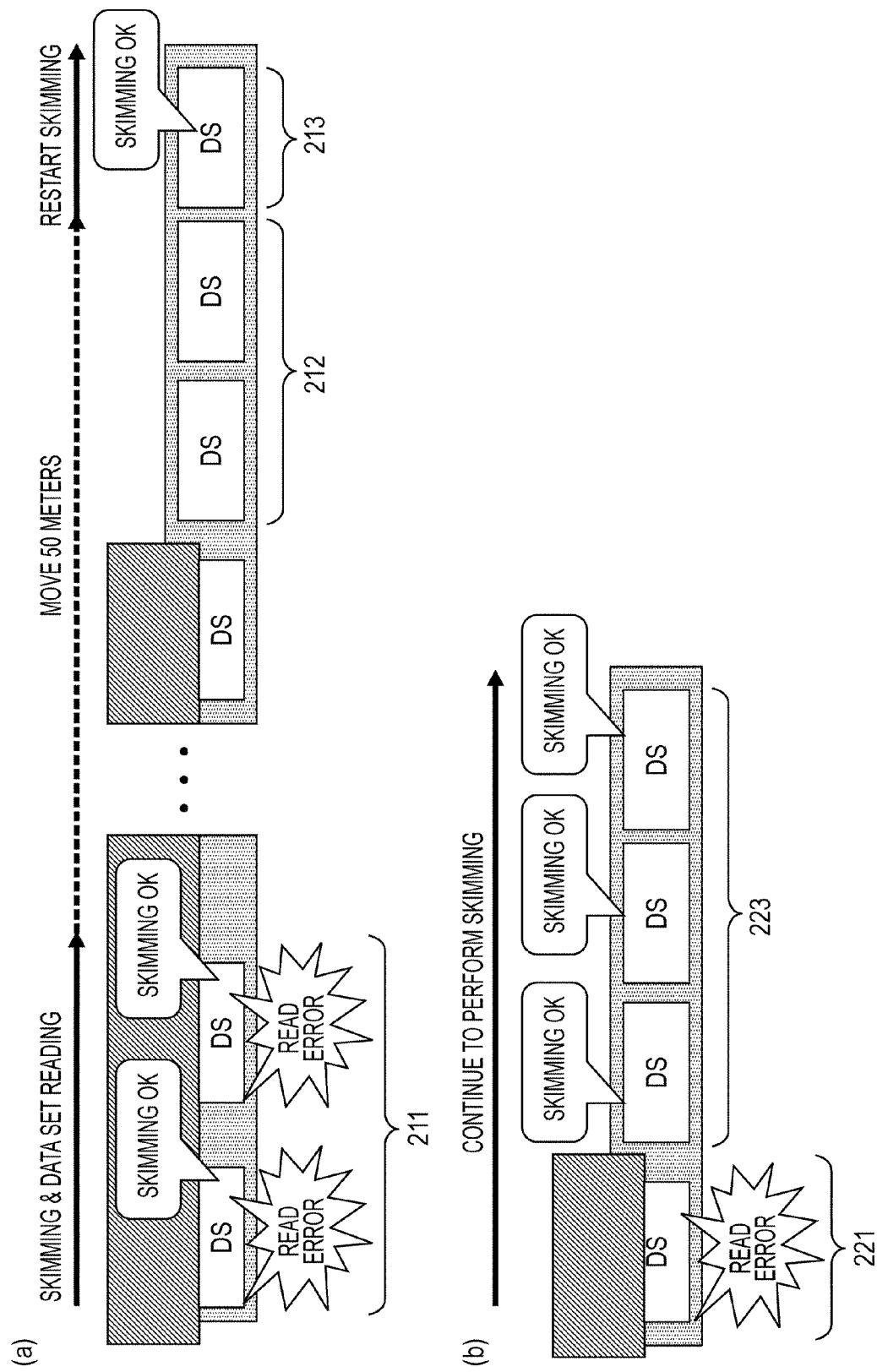
FIG. 10 is a diagram for illustrating differences in advantages of a first method and a second method in accordance with an embodiment of the present invention.

FIG. 10 is a diagram showing differences in advantages of the first and second methods. FIG. 10(a) shows the first method, whereas FIG. 10(b) shows the second method. In the drawing, an area with halftone dot meshing represents the old data, whereas an area with oblique lines represents the new data. In addition, a data set is abbreviated as "DS".

First, regarding a processing time, the second method has following advantages over the first method.

In the first method, as shown by an arrow in FIG. 10(a), the skimming operation is restarted after the skimming operation and the data set read operation are repeated and the tape then travels 50 meters. the shingling area ends after the 50-meter travel in the drawing. However, if the current position is still within the shingling area after the 50-meter travel, an operation for reading out a data set included in an area 211, namely, a data set included in the shingling area, has to be performed many times.

First, a travel distance for one cycle (STEPs 401 to 408) of the first method is a sum of 50 meters and a length equivalent to 20 data sets. Since the length of one data set is approximately equal to 7 centimeters, the travel distance is equal to 51.4 meters (=50 m+0.07 m×20).

In addition, time for one cycle is a sum of (i) time for skimming, (ii) time for reading 20 data sets while performing back hitching, and (iii) time for moving the tape 23 by 50 meters.

(i) Since the skimming is performed for four meters at a speed of 4.4 m/sec, the time for skimming is approximately equal to one second.

(ii) Since time for reading one data set while performing back hitching is approximately equal to 5 second, the time for reading 20 data sets while performing back hitching is approximately equal to 100 seconds.

(iii) Since the moving speed of the tape 23 is 10 m/sec, the time for moving the tape 23 by 50 meters is approximately equal to 5 seconds.

Accordingly, in the first method, the tape takes 106 seconds to travel 51.4 meters. Thus, it takes approximately 3000 seconds (approximately 50 minutes) to travel a distance of 1400 meters, which is the length of two tracks, at this speed.

On the other hand, in the second method, as shown by an arrow in FIG. 10(b), once the read head 14b is offset in the upper end direction, the skimming operation has to be continued but data sets included in an area 221 do not have to be read out.

First, time for reading out a data set according to the second method is a sum of (I) (II) time for confirming that the current position is in the shingling area in a procedure similar to that of the first method once and (III) time for continuing the skimming until the shingling area ends.

(I) and (II) are the same as (i) and (ii) of the first method and the tape takes 101 seconds to travel 1.4 meters.

(III) The tape travels the rest of the distance of (1400–1.4) meters at the skimming speed of 4.4 m/sec.

Accordingly, it takes approximately 419 seconds (≈101 seconds+(1400 m−1.4 m)/(4.4 m/sec)), which is approximately equal to 7 minutes, to travel the distance of 1400 meters, which is the length of two tracks.

Next, regarding an amount of readable data, the second method has following advantages over the first method. The end of the shingling area is not identified in the first method. Accordingly, if the shingling area ends at a position immediately after a start of a moving operation of the tape 23, the tape drive 10 does not notice the end and performs the processing at the position of 50 meters ahead. In such a case, as shown in FIG. 10(a), approximately 700 data sets, which remain on the tape 23 in a readable state, included in an area 212 are skipped and a read operation is started from a data set included in an area 213. Since a data size of one data set is approximately equal to 1.6 MB, a data size lost at this time is equal to or greater than 1 GB.

In the second method, readable data sets are not skipped and a read operation is started from a data set included in an area 223 located at a position immediately behind the end of the shingling area. Accordingly, a lost data size is equal to zero.

Meanwhile, the description has been given for a case where old data remaining behind new data is read out after the old data is overwritten with the new data in the embodiments, the present invention is not limited to this particular case. More specifically, as long as first data is read out from a tape medium on which the first data and second data are recorded in different formats, the present invention is applicable even if the first data and the second data are any kinds of data.

Here, the present invention may be realized by hardware or software. In addition, the present invention may be realized by a combination of the hardware and the software. Additionally, the present invention can be realized as a computer, a data processing system, and a computer program. This computer program may be recorded on a computer-readable medium and may be provided. Here, the medium may be an electronic medium, a magnetic medium, an optical medium, an electromagnetic medium, an infrared medium, or a semiconductor system (apparatus or device), or a transmission medium. Additionally, as the computer-readable medium, a semiconductor, a solid-state storage device, a magnetic tape, a removable computer diskette, a random access memory (RAM), a read only memory (ROM), a rigid magnetic disk, and an optical disk can be employed. Examples of an optical disk at the moment include a compact disk read only memory (CD-ROM), a compact disk-read/write (CD-R/W), and a digital versatile disk (DVD).

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An apparatus for reading out data recorded on a tape medium with a read head, the apparatus comprising:
a receiving unit for receiving a request for reading out first data from the tape medium on which the first data and second data are recorded in different formats;
a detecting unit for detecting, in response to the receiving unit's reception of the request, whether the read head and the first and second data recorded on the tape medium are in a specific positional relationship in which existence of the first data is recognizable but the first data is not readable; and
a moving unit for moving, if the detecting unit detects that the read head and the first and second data are in the specific positional relationship, the read head toward a position where the second data is recorded so that reading of the second data is skipped while existence of the second data is recognizable and the first data is read out after the existence of the first data becomes recognizable.

2. The apparatus according to claim 1, wherein the detecting unit detects whether the read head and the first and second data recorded on the tape medium are in the positional relationship in which existence of the first data is recognizable on the basis of identification information that is attached to the first data and is for identifying the format of the first data.

3. The apparatus according to claim 1, wherein the detecting unit detects whether the read head and the first and second data recorded on the tape medium are in the positional relationship in which the first data is not readable on the basis of a result of comparison of the number of times readout of the first data has failed with a predetermined threshold.

4. The apparatus according to claim 1, wherein the receiving unit receives the request for reading out the first data recorded behind an end of the second data from the tape medium on which a middle part of the first data is overwritten with the second data along the longitudinal direction of the tape medium after the first data is recorded at an area along a longitudinal direction of the tape medium.

5. The apparatus according to claim 1, wherein the moving unit moves the read head toward a position where the first data is recorded before the detecting unit detects, in response to the receiving unit's reception of the request, that the read head and the first and second data recorded on the tape medium are in the specific positional relationship.

6. An apparatus for reading out data recorded on a tape medium, the apparatus comprising:
a read head for reading out data recorded on the tape medium;
a controller for controlling, if it is detected, in response to a request for reading out first data from the tape medium on which the first data and second data are recorded in different formats, that the read head and the first and second data recorded on the tape medium are in a positional relationship in which existence of the first data is recognizable but the first data is not readable, movement of the read head to a position where the second data is recorded; and
a moving mechanism for moving the read head in accordance with the control of the controller.

7. An apparatus for reading out data recorded on a tape medium with a read head, the apparatus comprising:
a receiving unit for receiving a request for reading out first data from the tape medium on which a middle part of the first data is overwritten with second data in a format different from that of the first data along the longitudinal direction of the tape medium after the first data is recorded at an area along a longitudinal direction of the tape medium;
a first determining unit for determining, in response to the receiving unit's reception of the request, whether the read head is located at a position where one of the first data and the second data is recorded;
a second determining unit for determining, if the first determining unit determines that the read head is located at a position where the first data is recorded, whether the read head is located at a position where the first data is readable;
a moving unit for moving, if the second determining unit determines that the read head is not located at the position where the first data is readable, the read head toward a position where the second data is recorded;
a reading unit for reading out, if the second determining unit determines that the read head is located at the position where the first data is readable, the first data; and
a skipping unit for skipping, if the first determining unit determines that the read head is located at a position where the second data is recorded, reading of the second data.

8. A method for reading out data recorded on a tape medium with a read head, the method comprising the steps of:
receiving a request for reading out first data from the tape medium on which the first data and second data are recorded in different formats;
detecting, in response to the reception of the request, whether the read head and the first and second data recorded on the tape medium are in a specific positional relationship in which existence of the first data is recognizable but the first data is not readable;

moving, if it is detected that the read head and the first and second data are in the specific positional relationship, the read head toward a position where the second data is recorded; and skipping reading of the second data while existence of the second data is recognizable and reading out the first data after existence of the first data becomes recognizable.

9. A program product for allowing a computer to function as an apparatus for reading out data recorded on a tape medium with a read head, the program product allowing the computer to function as:

a receiving unit for receiving a request for reading out first data from the tape medium on which the first data and second data are recorded in different formats;

a detecting unit for detecting, in response to the receiving unit's reception of the request, whether the read head and the first and second data recorded on the tape medium are in a specific positional relationship in which existence of the first data is recognizable but the first data is not readable; and a moving unit for moving, if the detecting unit detects that the read head and the first and second data are in the specific positional relationship, the read head toward a position where the second data is recorded so that reading of the second data is skipped while existence of the second data is recognizable and the first data is read out after the existence of the first data becomes recognizable.

* * * * *